Nov. 20, 1951        T. M. PERRY        2,575,973
TANGENTIAL ACCELERATION GAUGE
Filed April 16, 1943
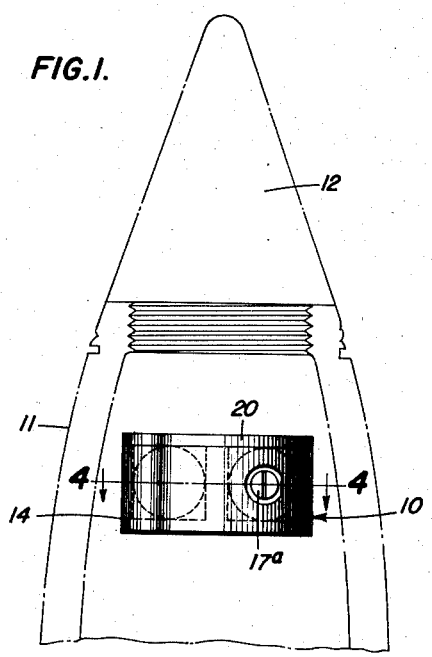
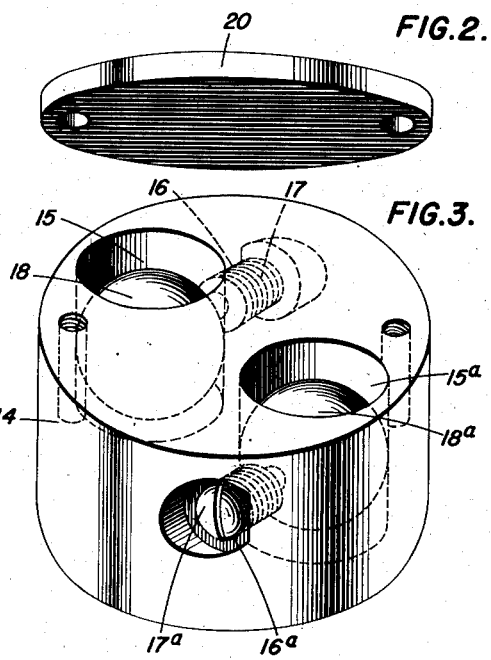
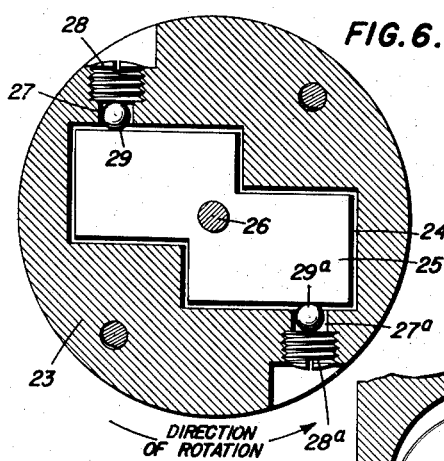
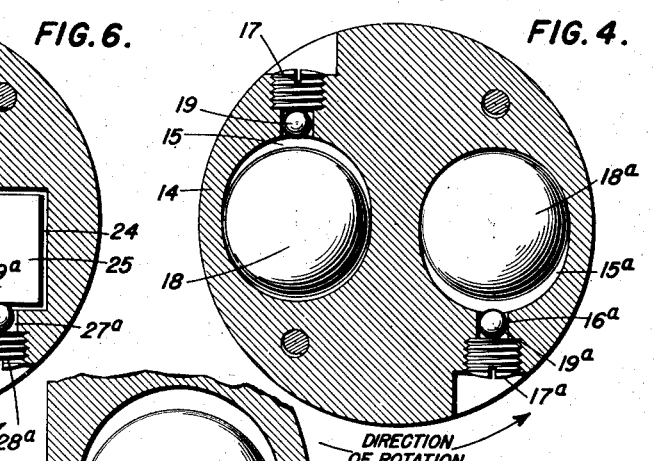
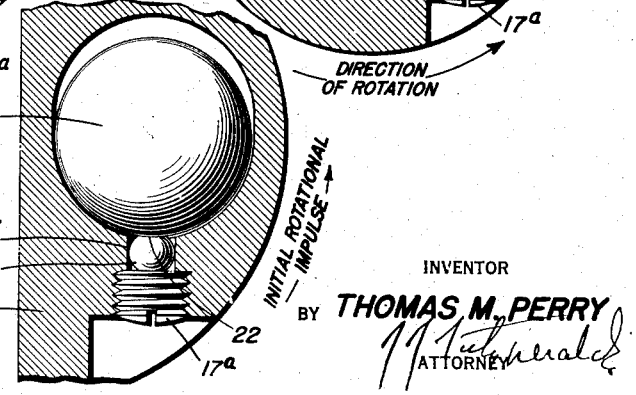
INVENTOR
BY THOMAS M. PERRY
ATTORNEY Patented Nov. 20, 1951

2,575,973

UNITED STATES PATENT OFFICE 2,575,973

TANGENTIAL ACCELERATION GAUGE

Thomas M. Perry, Bennington, Vt., assignor to the United States of America as represented by the Secretary of the Navy Application April 16, 1943, Serial No. 483,301

1 Claim. (Cl. 264—1)

This invention relates to measuring devices and has particular reference to a novel gage for measuring the angular or tangential acceleration of rotary projectiles. The new gage is simple and compact in construction and includes relatively few moving parts.

One object of the invention resides in the provision of a novel tangential acceleration gage for rotary projectiles which includes two relatively movable elements of different degrees of hardness for indicating the acceleration. A gage made in accordance with the invention comprises a housing designed to be mounted in the projectile casing for rotation therewith and having a recess offset from the axis of rotation. A relatively hard element, preferably of metal, is disposed in the recess adjacent a relatively soft element, and one of the elements is secured against movement with respect to the housing by suitable means in said housing. The other element is not secured to the housing and fits loosely in the recess, so that while angular acceleration is being imparted to the housing by the spin of the projectile produced by the rifling of the gun on firing, the said unsecured element will tend to remain at rest, due to its own inertia, and thus the secured element will press against it. As a result both elements will become distorted at the region of contact, the softer one, of course, to a greater extent than the other. Measurement of such distortion provides an indication of the angular acceleration to which it was due. In the preferred construction, the housing is provided with two sets of relatively movable elements disposed in diametrically opposed relation so that the gage does not affect the balance of the projectile with respect to its axis of rotation.

Another object of the invention is to provide a tangential acceleration gage of simple construction which is designed for manufacture at low cost and provides accurate measurements.

These and other objects of the invention may be understood by reference to the accompanying drawing, wherein Fig. 1 is an elevation of a gage embodying one form of the invention, a portion of the projectile being shown in phantom lines, to show the location of the gage;

Fig. 2 is a perspective view of a cover for the gage shown in Fig. 1;

Fig. 3 is a perspective view of the main body of the gage;

Fig. 4 is a transverse sectional view on line 4—4 of Fig. 1 of the gage showing the parts in their normal positions prior to firing of the projectile;

Fig. 5 is an enlarged transverse sectional view of part of the gage showing the final positions of the parts after the projectile is fired, and Fig. 6 is a view similar to Fig. 4 showing a modified form of the gage.

Referring first to Figs. 1 to 6 of the drawing, the gage 10 embodying the invention is shown mounted in a projectile comprising a hollow casing 11 and a nose portion 12 threaded in the front end of the casing. The gage is mounted in the casing 11 by any suitable means (not shown) for securing the gage against movement relative to the casing.

The gage comprises a cylindrical housing 14, which may be made of metal, having a pair of diametrically opposed recesses 15 and 15a in its front end. The recesses, as shown, are cylinders, whose axes extend parallel to the axis of rotation of the housing and which terminate short of the rear end thereof. Preferably, the bases of the cylinders are generally elliptical with their major axes extending at right angles to the common diameter on which the recesses lie. At one end of the recess 15 is a relatively small bore 16 extending parallel to the major axis of the recess and closed at its outer end by a plug or screw 17 threaded in the housing. A similar bore 16a communicates with the end of the recess 15a remote from the bore 16, the outer end of the bore 16a being closed by a plug or screw 17a.

The recesses 15 and 15a contain relatively hard balls 18 and 18a, respectively, which may be made of steel, the balls being movable freely in the recesses along their major axes. Within the bores 16 and 16a are relatively soft balls 19 and 19a, respectively, which may be made of copper, or the like. The balls 19 and 19a, as shown, are confined in the bores by the plugs 17 and 17a, respectively, so that part of each ball projects into the adjacent recess. A cover plate 20 is preferably secured on the front face of the housing to retain the balls 18 and 18a in their respective recesses, and to prevent axial shift of said balls, as will be clear from Fig. 1.

In operation, when the projectile is fired from a gun, the usual rifling in the gun barrel causes the projectile to rotate at a speed which accelerates rapidly as the projectile moves through the barrel, the rotation of the projectile here being assumed in such a direction that the housing 14 moves counterclockwise as shown in Fig. 4. Accordingly, the balls 18 and 18a move relatively outwardly in their recesses against the balls 19 and 19a, respectively, due to centrifugal force and the inertia of the balls 18, 18a incident to the angular acceleration of the projectile. As a result, the relatively soft balls 19 and 19a are compressed and distorted by pushing against the harder balls 18 and 18a, as shown in Fig. 5, because of the inertial resistance of the harder balls against the parts of the balls 19 and 19a projecting into the recesses. When the projectile is recovered, the gage is removed from the casing 11, and the balls 19 and 19a are removed from the housing 14 by unscrewing the plugs 17 and 17a. The amount of distortion of the balls 19 and 19a may then be determined, which gives a measure of the maximum angular or tangential acceleration of the projectile during its flight.

The gage shown in Fig. 6 comprises a cylindrical housing 23 having an offset recess 24 in its front end. As shown, the recess 24 is made up of two generally rectangular, diametrically opposed chambers having adjacent corners coinciding at the axis of rotation of the housing. A lever 25 is pivotally mounted in the recess on a pin 26 coinciding with the axis of rotation of the housing, the lever conforming to the contour of the recess but being somewhat smaller so that it may swing in the recess on the pivot pin. Near the ends of the recess are bores 27 and 27a which extend outwardly in opposite directions and are closed at their outer ends by plugs 28 and 28a, respectively, threaded in the housing. The bores 27 and 27a communicate with the recess and contain relatively soft metal balls 29 and 29a, respectively, confined between the plugs and the adjacent ends of the lever, which is made of a relatively hard metal, such as steel. When the projectile is being fired from a gun, the housing 23 rotates counterclockwise (Fig. 6) with a high angular acceleration, and the lever 25, due to its inertia, resists being set into corresponding rotation about the pin 26. The relatively soft balls 29 and 29a, therefore, are compressed and distorted by the forces they exert against the adjacent ends of the lever, in imparting the necessary acceleration to said lever, to make it rotate with the housing, the amount of the distortion depending upon the rate of angular acceleration of the projectile. By unscrewing the plugs 28 and 28a, the balls may be removed from the housing 23 to permit measurement of their deformation.

The new gage may be made in a compact form and is of a rugged construction having only a few moving parts. By employing two diametrically opposed sets of measuring element, the balance of the projectile with respect to its axis of rotation is preserved, and the deformation of one of the elements serves as a check on the deformation of the other.

What is claimed is:

A tangential acceleration gage for a spinning test projectile, comprising a cylindrical housing designed to be mounted within said projectile with the axis of the housing alined with the spin axis of the projectile, said housing having two similar recesses located symmetrically with respect to the said axis, two equal large and relatively massive hardened steel spheres, one in each recess, each said recess being substantially a right circular cylinder whose diameter and length are the same as the diameter of the sphere therein, but each said recess being slightly elongated in a direction chordal to the housing, thus permitting a slight amount of play of said sphere, each recess having in its side wall a smooth bore of a diameter relatively small with respect to the diameter of the spheres, the axes of said bores passing through the centers of the spheres and being in the plane transverse to the axis of the housing including said centers, said bores extending in opposite directions with respect to the straight line connecting said centers, a small sphere of soft metal fitting in each bore, each bore having a screw threaded extension at its end remote from the corresponding recess, a screw therein, and a shoulder at the junction of the smooth bore and the screw threaded extension thereof to form an abutment for the inner end of said screw, whereby each small sphere is caused to extend a predetermined distance into the adjacent recess when the inner end of the screw engages said small sphere and the corresponding abutment.

THOMAS M. PERRY.

REFERENCES CITED

The following references are of record in the file of this patent:

UNITED STATES PATENTS

| Number | Name | Date |
| --- | --- | --- |
| 993,091 | Meigs | May 23, 1911 |
| 1,310,892 | Schneider | July 22, 1919 |
| 1,870,405 | Doe | Aug. 9, 1932 |
| 2,155,635 | Bennett | Apr. 25, 1939 |
| 2,195,451 | Edwards | Apr. 2, 1940 |
| 2,263,512 | Logan | Nov. 18, 1941 |
| 2,362,123 | Doe | Nov. 7, 1944 |
| 2,390,581 | Gille | Dec. 11, 1945 |
| 2,436,529 | Pressley | Feb. 24, 1948 |
| 2,445,307 | Mindlin | July 13, 1948 |

FOREIGN PATENTS

| Number | Country | Date |
| --- | --- | --- |
| 7,161 | Switzerland | Aug. 4, 1893 |